US Patent Number: 4,957,790
Warren
Date of Patent: *Sep. 18, 1990

[54] ORIENTED POLYMERIC FILMS

[75] Inventor: Thomas C. Warren, Greer, S.C.

[73] Assignee: W. R. Grace & Co.-Conn., Duncan, S.C.

[*] Notice: The portion of the term of this patent subsequent to Jan. 10, 2006 has been disclaimed.

[21] Appl. No.: 136,054

[22] Filed: Dec. 21, 1987

[51] Int. Cl.$^5$ .............................................. B65B 53/00
[52] U.S. Cl. .................................. 428/34.9; 428/36.6; 428/515; 428/910
[58] Field of Search ...................... 428/34.9, 36.6, 910, 428/515; 264/176 R

[56] References Cited

U.S. PATENT DOCUMENTS

| | | | |
|---|---|---|---|
| 3,022,543 | 2/1962 | Baird et al. | 428/35 |
| 3,448,182 | 6/1969 | Derbyshire et al. | 264/230 |
| 3,580,829 | 5/1971 | Lanza | 522/121 |
| 3,741,253 | 6/1973 | Brax | 428/215 |
| 3,894,928 | 7/1975 | Kagiya et al. | 522/121 |
| 4,064,296 | 12/1977 | Bornstein et al. | 428/516 |
| 4,178,401 | 11/1979 | Weinberg . | |
| 4,374,223 | 12/1982 | Raamsdonk et al. . | |
| 4,515,745 | 5/1985 | Churma et al. | 264/211 |
| 4,525,257 | 3/1986 | Kurtz et al. . | |
| 4,576,993 | 3/1986 | Tamplin et al. | 525/240 |
| 4,614,764 | 12/1986 | Colombo et al. . | |
| 4,640,856 | 2/1987 | Ferguson et al. | 428/36 |
| 4,675,364 | 6/1987 | Churma et al. | 525/387 |
| 4,797,235 | 1/1989 | Garland et al. | 264/230 |

FOREIGN PATENT DOCUMENTS 62-252409 4/1988 Japan .

OTHER PUBLICATIONS

*Triallyl Cyanurate* (*TAC*), a supplier's brochure from National Starch and Chemical Corp., Salisbury, N.C.
Encyclopedia of Polymer Science and Technology, Plastics, Resins, Rubbers, Fibers published by John Wiley & Sons, Inc. pp. 331 to 414 of vol. 4.
"Development of Radiation Cross-Linking Process for High Voltage Power Cable", Sasaki et al. Japan Atomic Research Institute, Takasaki, Japan (1979) vol. 14 .
Radiation Physical Chemistry, pp. 821–830, and "Suppression of Discharge Breakdown of Polyethylene Insulation During Electron Beam Irradiation to Power Cable", Sasaki et al., Takasaki Radiation Chemistry Research Establishment, JAERI, Takasaki, Japan, (1981) vol. 18, No. 5-6, Radiation Physical Chemistry, pp. 847–852.

*Primary Examiner*—Edith Buffalow
*Attorney, Agent, or Firm*—John J. Toney; William D. Lee, Jr.; Jennifer L. Skord

[57] ABSTRACT

Described is the presence of both a pro-rad linking agent and irradiation such as electron beam irradiation, in the manufacturing process for making an oriented, i.e. heat-shrinkable, polymeric film. The presence of both results in an amount of cross-linking that is effective to accomplish an increased orientation rate during manufacturing.

19 Claims, No Drawings

ORIENTED POLYMERIC FILMS

FIELD OF THE INVENTION

The present invention relates to the use of both a pro-rad type of chemical cross-linking agent and irradiation in the manufacturing process for making an oriented, i.e. heat-shrinkable, polymeric film. Generally in the manufacture of heat shrinkable films, polymer layer(s) are melt extruded as a "blown bubble" through an annular die to form a tube which is cooled and collapsed, and then stretched (oriented) typically by inflating the extruded tube of film with a gas to form a "bubble" in the tube. Typically, irradiation is employed prior to orientation. By the practice of this invention, the orientation speed is improved.

Heat shrinkable polymeric films are widely used for packaging of fresh and processed meats, cheeses, poultry and a large number of non-food items. Some of the films are formed into heat shrinkable bags or pouches which are supplied to a meat packer. Typical polymers employed are linear low density polyethylene (LLDPE), low density polyethylene (LDPE), ethylene vinyl acetate (EVA) copolymer, and the like.

BACKGROUND OF THE INVENTION

It is generally well known in the art that irradiation, such as by electron beam irradiation, of certain polymeric film materials results in the irradiative cross-linking of the polymeric molecular chains contained therein and that such action generally results in a material having improved heat shrink properties, abuse resistance, structural integrity, tensile strength, puncture resistance, and/or delamination resistance. Such physical improvements from irradiation, in particular the improved heat shrink properties, are discussed in U.S. Pat. No. 3,022,543 (1962) to Baird et al. Many of the other physical improvements also are discussed at columns 2 and 8 of U.S. Pat. No. 4,178,401 (1979) to Weinberg and at column 4 of U.S. Pat. No. 3,741,253 to Brax. Furthermore, it is also known from U.S. Pat. No. 4,525,257 (1985) to Kurtz et al that low level irradiation under 2 MR of narrow molecular weight distribution, linear low density ethylene/alphaolefin (LLDPE) particulate copolymer sufficient to introduce cross-links into the particulate copolymer but insufficient to provide for significant measurable gelation produces improved copolymer rheology providing increased extensional viscosity during film fabrication, i.e. the bubble is more stable as the LLDPE is more easily stretchable.

That cross-linking of polymers may be accomplished chemically through utilization of chemical cross-linking agents is also well known to those of skill in the art. For instance, cross-linking agents, such as allyl compounds or organic peroxides, have been used to cross-link polyethylene polymers and copolymers. A general discussion of chemical crosslinking can be found at pages 331 to 414 of volume 4 of the Encyclopedia of Polymer Science and Technology, Plastics, Resins, Rubbers, Fibers published by John Wiley & Sons, Inc. and copyrighted in 1966. This document has a U.S. Library of Congress Catalog Card Number of 64-22188 and the referenced pages are hereby incorporated by reference. Typically, the chemical cross-linking agents react with the polymer to form a solid or highly viscous cross-linked copolymer. Furthermore, it is also known from U.S. Pat. No. 4,515,745 (1985) to Churma et al assignors to Union Carbide and U.S. Pat. No. 4,675,364 Churma et al assignors to Viskase that when an organic peroxide chemical cross-linking agent is used in manufacturing an extruded film having at least one layer of EVA, in a controlled amount small enough (0.05 to 0.015% agent by weight of the EVA layer) not to form gel measurable by ASTM test method number D 2765 (ASTM D2765 is further discussed below), i.e. no measurable gel means the EVA containing a crosslinking agent is soluble in a solvent such as xylene, then the rheology during extrusion is modified, i.e. the bubble is more stable as the EVA is more easily stretchable. A drawback of organic peroxides is the difficulty in controlling the amount used. Organic peroxides are free radical generators and will react as soon as they come in contact with the heat of the extruder. Thus, they can gum up the workings of the extruder before the polymeric film has a chance to exit the extruder. U.S. Pat. No. 4,614,764 (1986) to Colombo et al shows greater bubble stability in the blown tubular film extrusion process by controlling free radical generator type of cross-linking agents such as organic peroxides, by first modifying LLDPE in the molten state with a free radical generator and then blending the resultant with LLDPE, so the reaction has already occurred prior to blending this modified polymer with LLDPE in the extruder during blowing a film.

Also of interest is that electron beam irradiative cross-linking of the polyethylene insulation of high voltage power cables has a foaming problem which is alleviated by use of a chemical cross-linking agent, such as ethylene glycol dimethacrylate, diallyl maleate, dipropargyl maleate, dipropargyl monoallyl cyanurate, or triallyl cyanurate, which agent accelerates the electron beam so low megarad dosage of irradiation can be employed. This is discussed in "Development of Radiation Cross-linking Process for High Voltage Power Cable", Sasaki et al, Japan Atomic Research Institute, Takasaki, Japan, (1979) Vol. 14 Radiation Physical Chemistry, pages 821-830, and "Suppression of Discharge Breakdown of Polyethylene Insulation During Electron Beam Irradiation to Power Cable", Sasaki et al, Takasaki Radiation Chemistry Research Establishment, JAERI, Takasaki, Japan, (1981) Vol. 18, No. 5-6, Radiation Physical Chemistry, pages 847-852. Of related interest is U.S. Pat. No. 4,576,993 (1986) Tamplin et al assignors to Raychem which discloses LDPE cross-linked by 0.2 to 5 weight percent of pro-rad such as triallyl cyanurate and 2 to 80 megarads of irradiation for use in dimensionally recoverable articles such as high voltage insulation.

Also of interest is U.S. Pat. No. 4,374,223 issued Feb. 15, 1983 to Raamsdonk et al assignors to Olympia Werke which shows an elastic covering for closing off a nozzle outlet area containing at least one nozzle orifice of an ink printing head filled with an aqueous liquid, said covering comprising as elastomeric material having viscoelastic properties for filling exceedingly small cavities and interstices in the area to be closed off, comprising by weight: 100 parts ethylene-vinyl acetate copolymer having an ethylene: vinyl acetate ratio of 40:60; 20-40 parts talc, as mineral filler; 0.5-15 parts polycarbodiimide hydrolysis protection agent; 0.2-1 parts age retardant (antioxidant); 0.5-2 parts triallyl cyanurate; 3-5 parts 1-1-Bis(tert-butyl peroxy)-3,3,5-trimethyl cyclohexane; and 2-10 parts polyethylene glycol of molecular weight about 200.

However, it has been unexpectedly discovered that the combination of a pro-rad type of chemical crosslinking agent with irradiation has not only obviated the problem of carefully controlling the amount of chemical cross-linker so as to avoid gumming up the extruder but also has resulted in the orientation process for manufacturing polymeric films having a decreased time, i.e. increased speed or rate.

SUMMARY OF THE INVENTION

It is therefore an object of the present invention to provide a heat-shrinkable film manufactured by a process including the combination of pro-rad type of chemical cross-linking and irradiative cross-linking. In another aspect, the present invention provides for a method for the manufacture of a heat shrinkable polymeric film wherein the time for the orientation step in the manufacture of such films can be decreased, i.e. the orientation can be achieved at a greater speed than was heretofore possible. It is an unexpected advantage of the invention that the films can be made with lower extruder amps and pressure.

Therefore, the present invention provides a multilayer heat-shrinkable (oriented) film comprising at least one layer of cross-linkable polymer, said layer (1) originally containing a pro-rad agent and (2) being irradiated, both being to an extent sufficient to provide an amount of cross-linking effective to accomplish an increased orientation rate.

By "extent sufficient to provide an amount of cross-linking effective to accomplish an increased orientation rate" as that phrase is used herein, it is intended to mean that the amount of cross-linking from the presence of both the amount of pro-rad agent originally contained in the feed for the at least one layer of cross-linkable polymer in combination with the dosage of irradiation, regardless of whether or not the amount of cross-linking from either or both can be measured by the gel test, will increase the orientation rate during processing of the film as compared with the orientation rate of the corresponding polymeric film that (I) is only irradiated, (II) only contains a pro-rad agent, or (III) is both (a) free of a pro-rad agent and (b) not irradiated. In the Examples below the increased orientation rate of the various films is indicated by a greater processing speed in feet/minute for the inflated "bubble" during the orientation step of processing.

The present invention also provides a process for increasing the orientation rate during manufacturing a heat-shrinkable (oriented) polymeric film comprising: (a) introducing a pro-rad agent to a cross-linkable polymer by blending the cross-linking agent with the cross-linkable polymer, (b) extruding the blended cross-linkable polymer, (c) subjecting the extruded polymer to irradiation, (d) orienting the extruded polymer in at least one direction, and (e) recovering an oriented polymeric film, wherein (f) both the original amount of pro-rad agent and the dosage of irradiation are to an extent sufficient to provide an amount of cross-linking effective to accomplish an increased orientation rate during the orientation step.

The present invention also provides a multilayer heat-shrinkable (oriented) film comprising at least one layer of cross-linkable polymer, said layer (1) originally containing from about 0.001 to about 5% by weight of pro-rad type of cross-linking agent and (2) being subjected to irradiative cross-linking at a dosage from about 0.5 to about 20 MR.

DETAILED DESCRIPTION

Pro-rad compounds are compounds which have poly-functional, i.e. at least two, moieties such as C=C, C=N or C=O. Suitable pro-rad type of chemical cross-linking agents include, but are not limited to, polyfunctional vinyl or allyl compounds, for example triallyl cyanurate (TAC), triallyl isocyanuarte (TAIC) or pentaerythritol tetramethacrylate (PETMA), glutaraldehyde (GA), ethylene glycol dimethacrylate (EGDMA), diallyl maleate (DAM), dipropargyl maleate (DPM), or dipropargyl monoallyl cyanurate (DPMAC).

Typically, in the manufacture of films, a suitable polymer usually in the form of pellets or the like, is brought into a heated area where the polymer feed is melted and heated to its extrusion temperature and extruded as a tubular "blown bubble" through an annular die. Other methods, such as "slot die" extrusion wherein the resultant extrudate is in planar form, as opposed to tubular form, are also well known. After extrusion, the film is then typically cooled and then stretched, i.e. oriented by "tenter frasing" or by inflating with a "trapped bubble", to impart the heatshrinkable property to the film, as is further described below. Irradiation, typically via an electron beam, preferably takes place prior to the stretching for orienting the film. Below, first is described in detail introducing the chemical cross-linking agent to the cross-linkable polymer followed by the general process for making and orienting film. Then irradiation is described in detail.

Any cross-linkable polymer may be employed in the present invention. Suitable cross-linkable polymers are the polyolefins which are further described in the "Definitions" section below.

The terms "cross-linking," "cross-linkable," "cross-linked", and the like, as used herein relate to, but are not limited to, a gelation test, namely ASTM D-2765-84 "Standard Test Methods for Determination of Gel Content and Swell Ratio of Cross-linked Ethylene Plastics," pages 557–565 (January, 1985). In the test, the polymer is dissolved in decahydronapthalene or xylene, and the insoluble fraction produced by cross-linking is determined by the amount that dissolves versus the amount that gels. In the present invention, it is irrelevant whether the amount present of irradiation alone would be so minimal as not to cause measurable gelation, or whether the amount present of pro-rad type of chemical cross-linking agent alone would be so minimal as not to cause measurable gelation. There are other methods, such as infrared spectrophotometry, size exclusion chromotography, mass spectrophotometry, nuclear magnetic resonance, or shift in the polymer melt index, for measuring the effects of small amounts of irradiation or chemicals, said methods being well known to those skilled in the art, which methods could easily be employed for measuring the effect of a minimal amount of cross-linking or molecular weight increase whether by irradiation or by chemical agent. Accordingly, what is required is only that the combination of both a pro-rad type of chemical cross-linking agent and irradiation be sufficient to cause an improved faster orientation, i.e increased orientation rate.

In the practice of the invention, the pro-rad type of chemical cross-linking agent is preferably introduced by blending it into the solid pellets of polymer feed for the at least one layer of cross-linkable polymer, such as by melt blending with heat and/or by the use of a solvent such as isopropyl alcohol, thereby forming a master batch (MB) of pro-rad agent and polymer which may be stored. This master batch could be used as is for the polymer feed. Alternatively, it may be further mixed with pellets of the same or different polymer for the feed at an amount such that the resultant blend originally contains the desired concentration of chemical cross-linking agent.

While it is not intended to be bound to any theory, it is believed that the pro-rad does not react from the heat of melt blending or of the extruder but rather reacts when initiated by the electron beam irradiation. In other words, it is believed that if melt blending is used, the temperature from the heat will not be high enough to carry out the reaction of the pro-rad agent, and typical extrusion temperatures are not hot enough to carry out the cross-linking reaction of the pro-rad.

Thus, statements that the at least one layer of cross-linkable polymer "originally" contains or contained a pro-rad type of chemical cross-linking agent or statements about the "original" amount of cross-linking agent present are intended to be references to the amount measurable of pro-rad agent added into the polymer feed for the polymer layer. The resulting structure of the polymer irradiated in the presence of a pro-rad will not be the same as that irradiated without the pro-rad.

The pro-rad type of chemical cross-linking agent must be originally present to an extent sufficient in the polymer so that the combination of both chemical cross-linking agent and irradiation will provide an effective amount of cross-linking to accomplish an increased orientation rate. To achieve this sufficient extent, the pro-rad agent should be originally present in the composition of polymer feed for at least one film layer in an amount from about 0.001 to about 5.0% by weight, more preferably about 0.005 to about 2.5% by weight, even more preferably about 0.015 to about 1.0% by weight.

More particularly, the manufacture of shrink films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orientation may be conducted at some point during the cool down while the film is still hot and at a temperature within its orientation temperature range, followed by completing the cooling. Alternatively, after the post extrusion cooling, the relatively thick "tape" extrudate is then reheated to a temperature within its orientation temperature range and stretched, to orient or align the crystallites and/or molecules of the material and then cooled down. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively oriented.

The terms "orientation" or "oriented" are used herein to describe generally the process steps and resultant product characteristics obtained by stretching transversely, longitudinally, or both (whether during the post extrusion cool down or during reheating after the post extrusion cool down as described in the paragraph above) and substantially immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction, monoaxial orientation results. When the stretching force is simultaneously applied in two directions, biaxial orientation results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multi-layer film), is then oriented by stretching within its orientation temperature range. The stretching to orient may be accomplished in many ways such as, for example, by "trapped bubble" techniques or "tenter framing". These processes are well known to those in the art and refer to orientation procedures whereby the material is stretched in the cross or transverse direction (TD) and/or in the longitudinal or machine direction (LD or MD). After being stretched, the film is quickly cooled while substantially retaining its stretched dimensions which thus sets or locks-in the oriented molecular configuration.

The film which has been made may then be stored in rolls and utilized to package a wide variety of items. If the material was manufactured by "trapped bubble" techniques the material may still be in tubular form or it may have been slit and opened up to form a sheet of film material. In this regard, a product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

When a material is of the heat-shrinkable type (i.e. oriented), then after wrapping, the enclosed product may be subjected to elevated temperatures, for example, by passing the enclosed product through a hot air tunnel. This causes the enclosing heat shrinkable film to shrink around the product to produce a tight wrapping that closely conforms to the contour of the product. Such heat-shrinkable films are especially desirable for packaging food products such as cheese and meat. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bags or pouches forming methods, likewise, are well known to those of skill in the art.

Alternative methods of producing films of this type are known to those in the art. One well-known alternative is the method of forming a multi-layer film by an extrusion coating in combination with an extrusion or coextrusion process as was discussed above. In extrusion coating a first tubular layer or layers is extruded and thereafter an additional layer or layers is simultaneously or sequentially coated onto the outer surface of the first tubular layer or a successive layer.

The above general outline for manufacturing of films is not meant to be all inclusive since such processes are well known to those in the art. For example, see U.S. Pat. Nos. 4,274,900; 4,229,241; 4,194,039; 4,188,443; 3,741,253; 4,048,428; 3,821,182; and 3,022,543. The disclosures of these patents are generally representative of such processes and are hereby incorporated by reference.

Many other process variations for forming films are well known to those in the art. For example, conventional thermoforming or laminating techniques may be employed. For instance, multiple substrate layers may be first coextruded via a blown bubble tube with additional layers thereafter being extrusion coated or laminated thereon, or two multi-layer tubes may be coextruded with one of the tubes thereafter being extrusion coated or laminated onto the other.

In the preferred embodiment as illustrated in the examples below, the multi-layer film of the invention contains a barrier layer. The barrier layer may be composed of a layer comprising vinylidene chloride copolymer (PVDC, which is commonly known as saran), or composed of a layer comprising hydrolyzed ethylene-vinyl acetate copolymer (EVOH), preferably hydrolyzed to at least about 50%, most preferably to greater than about 99%, or composed of both a layer comprising vinylidene chloride copolymer and a layer comprising EVOH. When the barrier layer is composed of a layer comprising EVOH, the mole percent of vinyl acetate prior to hydrolysis should be at least about 29%, since for lesser amounts the effectiveness of the hydrolyzed copolymer as a barrier to fluids such as gas is substantially diminished. It is further preferred that the barrier copolymer have a melt flow being generally compatible with that of the other components of the multi-layer film, preferably in the range of about 3-10 (melt flow being determined generally in accordance with ASTM D1238). The gas of main concern is oxygen and transmission is considered to be sufficiently low, i.e. the barrier material is relatively gas impermeable, when the transmission rate for the barrier material is below 70 $cc/m^2$/mil thickness/24 hours/atms, as measured according to the procedures of ASTM Method D-1434. The barrier layer of this multi-layer barrier shrink film embodiment of the present invention has a transmission rate below this value. EVOH can be advantageously utilized in the film of the invention since irradiative high energy electron treatment of the fully coextruded film does not degrade an EVOH barrier layer, as could be the case for a vinylidene chloride copolymer barrier layer.

When as further discussed below, a vinylidene chloride copolymer (PVDC) is employed instead of or together with EVOH as the barrier layer, then the irradiation preferably should take place prior to application of the saran layer to avoid degradation thereof. This application may be achieved by well known extrusion coating methods, as discussed above. More particularly, the extrusion coating method of film formation is preferable to coextruding the entire film when it is desired to subject one or more layers of the film to a treatment which may be harmful to one or more of the other layers. Exemplary of such a situation is a case where it is desired to irradiate with high energy electrons one or more layers of a film containing a barrier layer comprised of one or more copolymers of vinylidene chloride (i.e. saran), such as of vinylidene chloride and vinyl chloride or such as of vinylidene chloride and methyl acrylate. In other words, the barrier layer includes a saran layer in addition to or instead of an EVOH layer. Those of skill in the art generally recognize that irradiation with high energy electrons is generally harmful to such saran barrier layer compositions, as irradiation may degrade and discolor saran, making it turn brownish. Thus, if full coextrusion followed by high energy electron irradiation of the multi-layer structure is carried out on a film having a barrier layer containing a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, simultaneously or sequentially extrusion coat other later layers (which may or may not have been irradiated) onto the outer surface of the extruded previously irradiated tube. This sequence allows for the high energy electron irradiative treatment of the first and later layer or layers without subjecting the saran barrier layer to the harmful discoloration effects thereof.

Irradiative cross-linking may be accomplished by the use of high energy electrons, ultra violet rays, X-rays, gamma rays, beta particles, etc. Preferably, electrons are employed up to about 20 megarads (MR) dosage. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many other apparatus for irradiating films are known to those of skill in the art. The irradiation is usually carried out at a dosage between about 0.5 MR and about 20 MR, with a preferred dosage range of about 1 MR to about 12 MR. Irradiation can be carried out conveniently at room temperature, although higher and lower temperatures, for example, 0° C. to 60° C. may be employed.

In the Examples below the multi-layer films were made by combining tubular coextrusion (colloquially called the hot blown bubble technique) with extrusion coating to achieve an oriented (heat-shrinkable) film. A tubular process was utilized wherein a coextruded tube of a two layer substrate core (a first sealing layer and a second layer) was extrusion coated with third layer of saran and another fourth layer simultaneously, then the four layer structure was cooled and collapsed, and then reheated and biaxially stretched in the transverse direction and in the longitudinal machine direction via inflating the tube with a bubble. Then the stretched bubble was cooled and collapsed, and the deflated film wound up as flattened, seamless, tubular film to be used later to make bags, overwrap, et cetera (with layer 4 as the package outside and sealing layer 1 as the package inside). As illustrated in the Examples below, the deflate speed (also referred to in the art as the "racking speed") i.e. how fast the oriented bubble of film can be cooled and collapsed, was significantly improved, i.e. the orientation processing was increased, when the film both (1) contained a pro-rad agent, and (2) had been irradiated.

In the Examples below that involve irradiation, prior to the coating of the saran layer and the additional layer, the two-layer substrate was guided through an ionizing radiation field; for example, through the beam of an electron accelerator with layer 2 being beam-side to receive a radiation dosage in the range of about 4.5 megarads (MR). Thus, when sealing layer 1 of a multi-layer film contains no pro-rad but layer 2 of the film contains pro-rad, then the sealing layer of the film will be cross-linked less by the same beam dosage than the second layer of the film will be. The second layer will receive an "effective" higher amount of cross-linking because of the presence of both the pro-rad and the electron beam irradiation. If there were no pro-rad present, then for layer 2 to receive that higher amount of cross-linking, a greater dosage of electron beam irradiation would have to be employed. That would mean sealing layer 1 would also be receiving that greater dosage which could interfere with its sealing properties.

DEFINITIONS

As used herein the term "extrusion" or the term "extruding" is intended to include extrusion, coextrusion, extrusion coating, or combinations thereof, whether by tubular methods, planar methods, or combinations thereof.

An "oriented" or "heat shrinkable" material is defined herein as a material which, when heated to an appropriate temperature above room temperature (for example 96° C), ill have a free shrink of about 5% or greater in at least one linear direction.

Unless specifically set forth and defined or otherwise limited, the terms "polymer" or "polymer resin" as used herein generally include, but are not limited to, homopolymers, copolymers, such as, for example block, graft, random and alternating copolymers, terpolymers, etc. and blends and modifications thereof. Furthermore, unless otherwise specifically limited the term "polymer" or "polymer resin" shall include all possible molecular configurations of the material. These structures include, but are not limited to, isotactic, syndiotactic and random molecular configurations.

The term "polyethylene" as used herein, which "polyethylene" is a type of polyolefin that may be employed in the film of the invention, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are generally miscible with paraffin; and the high molecular weight polymers are resins generally used in the plastics industry. Polyethylenes having densities ranging from about 0.900 g/cc to about 0.935 g/cc are called low density polyethylenes (LDPE) while those having densities from about 0.935 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures.

The term "linear low density polyethylene" (LLDPE) as used herein, for a type of polyethylene which may be employed in the film of the invention, refers to the newer copolymers of a major amount of ethylene with a minor amount of one or more comonomers selected from $C_3$ to about $C_{10}$ or higher alpha olefins such as butene-1, 4-methyl pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, more preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. Linear low density polyethylene resins of this type are commercially available and are manufactured in low pressure vapor phase and liquid phase processes using transition metal catalysts. LLDPE is well known for its structural strength and anti-stresscracking properties. Also, LLDPE is known for its favored properties in the heat shrink process, and thus is well suited to make a heat shrinkable film as discussed above. Also, very low density linear low density polyethylenes (VLDPE) may be employed, and such have a density from about 0.910 g/cc to about 0.860 g/cc, or even lower.

The term "ethylene vinyl acetate copolymer" (EVA) as used herein for a type of polyolefin refers to a copolymer formed from ethylene and vinyl acetate monomers wherein the ethylene derived units in the copolymer are present in major amounts by weight and the vinyl acetate (VA) derived units in the copolymer are present in minor amounts by weight. EVA is also known for having structural strength, as LLDPE does. For film forming purposes, it is desirable that the VA content of the EVA be from about 4% to about 25% by weight, as when an EVA has a higher VA content the EVA behaves more like a glue or adhesive.

The term "ethylene alkyl acrylate copolymer" (EAA) as used herein for a type of polyolefin refers to a copolymer formed from ethylene and alkyl acrylate wherein the ethylene derived units in the copolymer are present in major amounts by weight and the alkyl acrylate derived units in the copolymer are present in minor amounts by weight. Thus, the term "ethylene-methyl acrylate copolymer" (EMA) as used herein for a type of polyolefin, refers to a copolymer formed from ethylene and methylacrylate monomers. The term "ethylene-ethylacrylate copolymer" (EEA) as used herein for a type of polyolefin, refers to a copolymer formed from ethylene and ethyl acrylate monomers. The term "ethylene-butyl acrylate copolymer" (EBA) as used herein for a type of polyolefin, refers to a copolymer formed from ethylene and butyl acrylate monomers. Many suitable EBA's are commercially available and these have a butyl acrylate content from about 3% to about 18% by weight.

Blends of all families of polyolefins, such as blends of EVA, EMA, EEA, EBA, VLDPE, and LLDPE, may also be advantageously employed.

EXAMPLES

The following Examples are intended to illustrate the preferred embodiments of the invention and it is not intended to limit the invention thereby.

Materials employed in the examples:

USI is a commercial supplier of NPE No. 4771, which is an EBA having about 5% by weight butyl acrylate (the butyl groups are normal butyl, not tert butyl) and a melt index of 3 and a melting point of about 107 to 108° C.

Some of the LLDPE employed in the examples was Dowlex 2045.03; the melt index is 1.1, and the density is 0.918 and the comonomer is octene. Some of the LLDPE employed was Dowlex 4002; the melt index is 3.3, and the density is 0.912 and the comonomer is octene. Both were supplied by Dow Chemical.

The VLDPE employed in some of the examples was XU 61512.08L, supplied by Dow Chemical. It has a melt index of 0.8 and a density of 0.905, and the comonomer is octene.

The saran employed in the laboratory examples was XU 32027.01 supplied by Dow Chemical Corporation. It is a copolymer of vinylidene chloride with methyl acrylate. It is referred to herein as SARAN-MA.

Some of the EVA employed in the laboratory examples was Elvax 3128, which is an EVA containing 9% VA and having a melt index of 2.0. It is supplied by Du Pont.

Also as indicated, one or more of the polymeric layers was prepared from a master batch (MB). The MB1 was made by heat blending VLDPE and triallyl cyanurate (TAC) using a Berstorff twin screw extruder. The resultant MB contained 2.5% by weight TAC. The MB2 was made the same way but using EBA instead of VLDPE with the resultant MB2 containing 2.0% by weight TAC. The TAC pro-rad type of chemical crosslinking agent employed in the laboratory examples was supplied by National Starch and Chemical Corporation, Salisbury, North Carolina. It is a commercially available triallyl cyanurate.

For some of the examples, the master batch was further blended with more polymer (such as EBA or VLDPE) for the feed and this further blended feed was extruded into the film.

Unoriented mono-layer films were made by hot blowing an extruded tube.

Multi-layer films were made by first hot blowing through an annular die a two-layer extruded tube of the structure: LAYER 1/LAYER 2 as the substrate. Sometimes a 4½ inch (11.43 cm) diameter extruder was used and sometimes a 3½ inch (8.89 cm) diameter extruder was used. Then with a two-ply die, layer 3 of saran-MA and an EVA layer 4 were extrusion coated on. The resultant was then cooled and collapsed. The tube was then reheated and oriented by stretching via a trapped bubble 4:1 in the transverse direction and 3:1 in the longitudinal direction for an overall biaxial orientation of 12:1. Where some of the samples have irradiation indicated, the two-layer substrate was irradiated at 4.5 MR prior to coating on the layer of saran-MA and layer 4.

|  | SUBSTRATE LAYERS | | EXTRUSION COATED LAYERS | |
|---|---|---|---|---|
|  | SEALING LAYER 1 | * LAYER 2 | BARRIER LAYER 3 | OUTSIDE LAYER 4 |
| Polymer Before Orientation Thickness (mils)*** | EVA 3 | Polyolefin** 14.5 | SARAN 2.4 | EVA 6.5 |

*The MB containing TAC pro-rad was added to Layer 2.
**Polyolefin was VLDPE, LLDPE, EVA, and/or EBA.
***After orientation, the total thickness of the 4-layer film was about 2.2 mils to about 2.6 mils.

Percentages indicated in the examples were calculated as percent by weight. Standard testing methods were employed as follows: percent heat shrinkage was measured in accordance with ASTM D 2732, haze was measured in accordance with ASTM D 1003, peak force and peak energy were measured in accordance with ASTM D 3763.

EXAMPLE I

Using the materials and process described in the paragraphs above, the following oriented, four-layer film structures were prepared using a 4½ inch (11.43 cm) diameter extruder for the substrate:

TABLE IA

| SAMPLE NUMBER (AND IRRADIATION IN MR OF SUBSTRATE) | COEXTRUDED SUBSTRATE | | EXTRUSION COATED LAYERS | |
|---|---|---|---|---|
|  | LAYER 1 | LAYER 2 | LAYER 3 | LAYER 4 |
| 1 (4.5 MR) Comparison | EVA | 75% VLDPE 25% EBA | SARAN-MA | EVA |
| 2 (4.5 MR) | EVA | 60% VLDPE 25% EBA 15% MB1 | SARAN-MA | EVA |
| 3 (4.5 MR) | EVA | 38% VLDPE 25% EBA 37% MB1 | SARAN-MA | EVA |

The results are summarized in Table IB below:

TABLE IB

| SAMPLE NUMBER (AND IRRADIATION IN MR OF SUBSTRATE) | * ORIENTATION RATE FEET/MIN (meters/min) | ** % PRO-RAD OF LAYER 2 | EXTRUDER AMPS | EXTRUDER HEAD PRESSURE PSIG (kg/cm²) |
|---|---|---|---|---|
| 1 Comparison (4.5 MR) | 67 (20.4) | 0 | 143 | 4360 (308) |
| 2 (4.5 MR) | Over 80 (24.4) | 0.375 | 117 | 3750 (265) |

TABLE IB-continued

| | | | | |
|---|---|---|---|---|
| 3 (4.5 MR) | Over 80 (24.4) | 0.925 | 107 | 3580 (253) |

| SAMPLE NUMBER (AND IRRADIATION IN MR OF SUBSTRATE) | % Shrinkage at 185° F. (85° C.) TD | LD | HAZE | PEAK FORCE 12 Ft/Sec | PEAK ENERGY 12 Ft/Sec |
|---|---|---|---|---|---|
| 1 Comparison (4.5 MR) | 41 | 26 | 5.4 | 51.1 | 2.39 |
| 2 (4.5 MR) | 40 | 26 | 4.6 | 50.9 | 2.40 |
| 3 (4.5 MR) | 38 | 22 | 4.4 | 47.3 | 2.12 |

*Here, the rack had not been modified and the maximum speed it could be run was about 80 feet/minute. In later experiments as can be seen below, the rack was modified so it could be run as fast improvement from the presence of pro-rad in the film would allow.
**Triallyl cyanurate was the pro-rad.

Regarding Samples 2 and 3, both of them (1) contained pro-rad and (2) had been irradiated at 4.5 MR. The rack employed could only reach a maximum speed of 80 feet/minute, and it is believed the Samples could have been oriented even faster. On the other hand, comparison Sample 1 oriented at only 67 feet/minute. Thus, an increased orientation rate as illustrated here can be achieved with a combination of both (1) pro-rad agent and (2) irradiation.

Also, both the extruder amps and head pressure decreased when 0.375% pro-rad was employed and decreased even more when 0.925% pro-rad was employed as compared to Sample 1 where no pro-rad was employed.

Furthermore, the presence of the pro-rad does not have a deleterious effect on physical properties, as the tests of % shrinkage, haze, peak force, and peak energy remained essentially the same for Samples 1, 2 and 3.

EXAMPLE II

Using the materials and process described in the paragraphs above, the following oriented four-layer film structures were prepared as in Example I but using a 3½ inch (8.89 cm) diameter extruder for the substrate:

TABLE IIA

| SAMPLE NUMBER (AND IRRADIATION IN MR OF SUBSTRATE) | COEXTRUDED SUBSTRATE | | EXTRUSION COATED LAYERS | |
|---|---|---|---|---|
| | LAYER 1 | LAYER 2 | LAYER 3 | LAYER 4 |
| 1 (4.5 MR) Comparison | EVA | 75% VLDPE 25% EBA | SARAN-MA | EVA |
| 2 (4.5 MR) | EVA | 68% VLDPE 25% EBA 7% MB1 | SARAN-MA | EVA |
| 3 (4.5 MR) | EVA | 60% VLDPE 25% EBA 15% MB1 | SARAN-MA | EVA |

The results are summarized in Table IIB below:

TABLE IIB

| SAMPLE NUMBER (AND IRRADIATION IN MR OF SUBSTRATE) | * ORIENTATION RATE FEET/MIN (Meters/min) | ** % PRO-RAD OF LAYER 2 | EXTRUDER AMPS | EXTRUDER HEAD PRESSURE PSIG (kg/cm²) |
|---|---|---|---|---|
| 1 (4.5 MR) Comparison | 78 (238) | 0 | 47 | 5700 (402) |
| 2 (4.5 MR) | 95 (290) | 0.175 | 44 | 5500 (388) |
| 3 (4.5 MR) | 103 (31.4) | 0.375 | 42 | 5300 (374) |

*Here the rack had been modified to run as fast as allowable from the improvement from the presence in the film of a pro-rad.
**Triallyl cyanurate was the pro-rad.

With regard to Samples 2 and 3, both of them (1) contained pro-rad and (2) had been irradiated at 4.5 MR. They oriented at 95 feet/minute and 103 feet/minute respectively. Thus, the orientation rate increased from Sample 2 to 3 as the amount of pro-rad increased, and both rates were much improved over the 78/feet minute orientation rate of comparison Sample 1 which had been irradiated at 4.5 MR but contained no pro-rad. Thus, an increased orientation rate as illustrated here can be achieved with a combination of both (1) pro-rad agent and (2) irradiation. Also, both the extruder amps and head pressure decreased when 0.175% pro-rad was used in Sample 2 and decreased even more when 0.375% pro-rad was used in Sample 3 as compared to Sample 1 where no pro-rad was used.

EXAMPLE III

Using the materials and process described in the paragraphs, the following oriented four-layer film structures were prepared as in Example I using a 4½inch (11.43 cm) diameter extruder for the substrate.

TABLE III

| SAMPLE NUMBER (AND IRRADIATION IN MR OF SUBSTRATE) | COEXTRUDED SUBSTRATE | | EXTRUSION COATED LAYERS | |
|---|---|---|---|---|
|  | LAYER 1 | LAYER 2 | LAYER 3 | LAYER 4 |
| 1 (4.5 MR) Comparison | EVA | 75% VLDPE 25% EBA | SARAN-MA | EVA |
| 1A (4.5 MR) | EVA | 75% VLDPE 25% MB2 | SARAN-MA | EVA |
| 1B (4.5 MR) | EVA | 60% VLDPE 25% EBA 15% MB1 | SARAN-MA | EVA |
| 2 (4.5 MR) Comparison | EVA | 75% EVA 25% EBA | SARAN-MA | EVA |
| 2A (4.5 MR) | EVA | 75% EVA 25% MB2 | SARAN MA | EVA |
| 3 (4.5 MR) Comparison | LLDPE (0.912) | 75% LLDPE (0.918) 25% EBA | SARAN-MA | EVA |
| 3A (4.5 MR) | LLDPE (0.912) | 75% LLDPE (0.918) 25% MB2 | SARAN-MA | EVA |
| 4 (4.5 MR) Comparison | LLDPE (0.912) | 75% LLDPE (0.918) 25% VLDPE | SARAN-MA | 75% LLDPE (0.912) 25% EBA |
| 4A (4.5 MR) | LLDPE (0.912) | 75% LLDPE (0.918) 25% MB1 | SARAN-MA | 75% LLDPE (0.912) 25% EBA |

The results are summarized in Table III B below.

TABLE IIIB

| SAMPLE NUMBER (AND IRRADIATION IN MR OF SUBSTRATE) | * ORIENTATION RATE FEET/MIN (meters/min) | ** % PRO-RAD OF LAYER 2 |
|---|---|---|
| 1 (4.5 MR) Comparison | 76 to 78 (23.2 to 23.8) | 0 |
| 1A (4.5 MR) | 88 (26.8) | 0.50 |
| 1B (4.5 MR) | 103 (31.4) | 0.375 |
| 2 (4.5 MR) | 103 (31.4) | 0 |
| Comparison |  |  |
| 2A (4.5 MR) | 121 (36.9) | 0.50 |
| 3 (4.5 MR) | 40 (12.2) | 0 |
| Comparison |  |  |
| 3A (4.5 MR) | 50 (15.2) | 0.50 |
| 4 (4.5 MR) Comparison | 25 (7.6) | 0 |
| 4A (4.5 MR) | 40 (12.2) | 0.625 |

*Here the rack had been modified to run as fast as allowable from the improvement from the presence in the film of a pro-rad.
**Triallyl cyanurate was the pro-rad.

With regard to Samples 1A and 1B, both of them (1) contained pro-rad and (2) had been irradiated at 4.5 MR. They oriented at 88 feet/minute and 103 feet/minute respectively, both rates being much improved over the 76 to 78 feet/minute orientation rate of comparison Sample 1 which had been irradiated at 4.5 MR but contained no pro-rad.

Likewise with regard to Sample 2A which (1) contained pro-rad and (2) had been irradiated at 4.5 MR, it oriented at 121 feet/minute. This was much faster than the orientation rate of 103 feet/minute of Sample 2 which had been irradiated at 4.5 MR but contained no pro-rad.

Likewise with regard to Sample 3A which (1) contained pro-rad and (2) had been irradiated at 4.5 MR, it oriented at 50 feet/minute. This was much faster than the orientation rate of 40 feet/minute of Sample 3 which had been irradiated at 4.5 MR but contained no pro-rad.

Likewise with regard to Sample 4A which (1) contained pro-rad and (2) had been irradiated at 4.5 MR, it oriented at 40 feet/minute. This was much faster than the orientation rate of 25 feet/minute of Sample 4 which had been irradiated at 4.5 MR but contained no pro-rad.

Thus, an increased orientation rate as illustrated here can be achieved with a combination of both (1) pro-rad agent and (2) irradiation.

EXAMPLE IV

By hot blowing extruded tubes as discussed above, unoriented monolayer films were made and an experiment was run to determine how much gel could be measured by comparing film samples that were irradiated only with samples that were irradiated and also contained the pro-rad TAC. Varying amounts of irradiation and amounts of TAC were employed. The gel test was performed by refluxing samples in toluene for 21 hours, which is a variation of ASTM D 2765 which uses xylene or decalin. These samples comprised (A) VLDPE, (B) sample A blended with 2% TAC, and (C) sample A blended with 5% TAC. The blending of VLDPE and pro-rad for the B samples and the C samples was accomplished using a single screw extruder. A chart of the gel results is as follows:

TABLE IV

| | Gel Content, % | | |
|---|---|---|---|
| Irradiation Dose MR | Samples A VLDPE | Samples B A + 2% TAC | Samples C A + 5% TAC |
| 0 | 0 | 0 | 0 |
| 2.1 | 0 | 2.2 | 0.97 |
| 4.2 | 9.8 | 31.5 | 28.6 |
| 6.1 | 30.7 | 46.9 | 44.8 |
| 7.9 | 46.3 | 58.2 | 56.1 |

It is noted that for the B samples containing 2% TAC, and for the C samples containing 5% TAC, about the same % gel was measurable at a particular irradiation dosage. While it is not intended to be bound by any theory, it is believed this is due to blending problems with the single screw extruder employed. Reference is made to the other Examples I, II, and III above, wherein the master batch of polyolefin and pro-rad was made by employing a Berstorff twin screw extruder.

While the present invention has been disclosed in connection with the preferred embodiment thereof, it should be understood that there may be other embodiments which fall within the spirit and scope of the invention as defined by the following claims.

What is claimed is:

1. A multilayer heat-shrinkable (oriented) film comprising at least one layer of cross-linkable polymer, said layer (1) (originally) containing a pro-rad agent and (2) being irradiated, both being to an extent sufficient to provide an amount of cross-linking effective to accomplish an increased orientation rate.

2. The film of claim 1 wherein said pro-rad agent is (originally) present in an amount from about 0.001 to about 5.0% by weight.

3. The film of claim 1 wherein said pro-rad agent is a compound having poly-functional moities.

4. The film of claim 3 wherein said pro-rad is triallyl cyanurate, triallyl isocyanurate, glutaraldehyde, ethylene glycol dimethacrylate, diallyl maleate, dipropargyl maleate, dipropargyl monoallyl cyanurate, or pentaerythritol tetramethacrylate.

5. The film of claim 1 wherein the irradiation is in a dosage from about 0.5 MR to about 20 MR.

6. The film of claim 1 wherein the cross-linkable polymer is a polyolefin.

7. The film of claim 6 wherein the polyolefin is HDPE, LDPE, MDPE, LLDPE, VLDPE, EVA, EAA, EMA, EBA, EEA, or mixtures thereof.

8. The film of claim 1 further including a barrier layer.

9. A bag formed from the film of claim 1, said bag having end seal(s), side seal(s), or a combination thereof.

10. The bag of claim 9 wherein said pro-rad agent is originally present in an amount from about 0.001 to about 5.0% by weight.

11. The bag of claim 9 wherein said pro-rad agent is a compound having poly-functional moieties.

12. The bag of claim 11 wherein said pro-rad is triallyl cyanurate, triallyl isocyanurate, glutaraldehyde, ethylene glycol dimethacrylate, diallyl maleate, dipropargyl maleate, dipropargyl monoallyl cyanurate, or pentaerythritol tetramethacrylate.

13. The bag of claim 9 wherein the irradiation is in a dosage from about 0.5 MR to about 20 MR.

14. The bag of claim 9 including a barrier layer.

15. A multilayer heat-shrinkable (oriented) film comprising at least one layer of cross-linkable polymer, said layer (1) originally containing from about 0.001 to about 5.0% by weight of pro-rad agent and (2) being subjected to irradiative cross-linking at a dosage from about 0.5 to about 20 MR.

16. The film of claim 15 including a barrier layer.

17. The film of claim 1 wherein the irradiation is in a dosage from about 1 MR to about 8 MR.

18. The process of claim 9 wherein the irradiation is in a dosage from about 1 MR to about 8 MR.

19. The bag of claim 9 wherein the irradiation is in a dosage from about 1 MR to about 8 MR.

* * * * *